United States Patent
Park et al.

(10) Patent No.: US 9,710,932 B2
(45) Date of Patent: Jul. 18, 2017

(54) DISPLAY APPARATUS AND CONTROL METHOD THEREOF

(71) Applicant: SAMSUNG ELECTRONICS CO., LTD., Suwon-si (KR)

(72) Inventors: Hong-seok Park, Suwon-si (KR); Kil-soo Jung, Osan-si (KR); Byung-chul Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/615,466

(22) Filed: Feb. 6, 2015

(65) Prior Publication Data

US 2015/0243052 A1 Aug. 27, 2015

(30) Foreign Application Priority Data

Feb. 21, 2014 (KR) ........................ 10-2014-0020405

(51) Int. Cl.
| | | |
|---|---|---|
| *G06T 11/00* | (2006.01) | |
| *G06F 3/0484* | (2013.01) | |
| *G09G 5/02* | (2006.01) | |
| *G09G 3/20* | (2006.01) | |

(52) U.S. Cl.
CPC ........ *G06T 11/001* (2013.01); *G06F 3/04842* (2013.01); *G09G 5/02* (2013.01); *G09G 3/2003* (2013.01); *G09G 2320/0666* (2013.01)

(58) Field of Classification Search
CPC .... G09G 5/02; G09G 5/06; G09G 2320/0666; G09G 2320/06; H04N 1/60; H04N 1/6008
See application file for complete search history.

(56) References Cited

U.S. PATENT DOCUMENTS

| | | | | |
|---|---|---|---|---|
| 6,476,800 | B2 * | 11/2002 | Millman | ............... G06F 1/3203 345/212 |
| 7,145,572 | B2 * | 12/2006 | Dresevic | .............. A63B 69/205 345/589 |
| 8,120,670 | B2 | 2/2012 | Kwon et al. | |
| 8,175,409 | B1 * | 5/2012 | Wilensky | .............. G06T 7/0083 382/274 |
| 8,358,265 | B2 | 1/2013 | Kobiki et al. | |

FOREIGN PATENT DOCUMENTS

| | | |
|---|---|---|
| JP | 2010266481 A | 11/2010 |
| KR | 100308580 B1 | 9/2001 |
| KR | 10-2009-0109660 A | 10/2009 |
| KR | 100978659 B1 | 8/2010 |
| KR | 1020110037068 A | 4/2011 |

* cited by examiner

Primary Examiner — Antonio A Caschera
(74) Attorney, Agent, or Firm — Sughrue Mion, PLLC

(57) ABSTRACT

A display apparatus includes: a display configured to display an image; an image processor configured to process the displayed image; and a controller configured to control the image processor to adjust a blue (B) value of red (R), green (G), and B values constituting the image based on at least one of information about a user and information about a viewing habits of the user.

17 Claims, 16 Drawing Sheets

DISPLAY APPARATUS AND CONTROL METHOD THEREOF

CROSS-REFERENCE TO RELATED APPLICATION(S)

This application claims priority under 35 U.S.C. §119 from Korean Patent Application No. 10-2014-0020405, filed on Feb. 21, 2014, in the Korean Intellectual Property Office, the disclosure of which is incorporated herein by reference in its entirety.

BACKGROUND

1. Field

The present general inventive concept generally relates to providing a display apparatus and a control method thereof, and more particularly, to providing a display apparatus that adjusts a color of an image, and a control method thereof.

2. Description of the Related Art

The development of electronic technologies has brought about the development of various types of display apparatuses. In particular, display apparatuses, such as a TV, a personal computer (PC), a laptop computer, a tablet PC, a portable phone, an MP3 player, etc., are now being used in most homes.

In order to meet the needs of users for newer and diverse functions, efforts to develop display apparatuses in newer forms have been made.

However, there is a problem with the harmfulness of blue light emitted from a display apparatus that occurred together. Blue light and the harmfulness of the blue light to a human body will now be described with reference to FIGS. 1 and 2.

FIG. 1 is a view illustrating a spectrum of a wavelength of blue light. A first area A denotes an ultraviolet area, a second area B denotes a visible area, and a third area C denotes an infrared area.

The blue light as shown in FIG. 1 may be an area corresponding to a portion of the first area A and a portion the second area B. In detail, the blue light may refer to light (a fourth area D) corresponding to a wavelength area between 380 nm and 495 nm. Also, the blue light may have B pixel value of R, G, and B pixel values displayed by a display.

FIG. 2 is a view illustrating an effect of blue light on retina. As shown in FIG. 2, the blue light is not absorbed into a cornea 21 or an eye lens 22 of an eye. In other words, the blue light output from a display apparatus reaches a retina 23 to lower a function of the retina 23. A long-term exposure to the blue light causes eye fatigue, eye pain, retinal damage, sleep disturbance, video display terminal (VDT) syndrome, obesity, insomnia, shoulder discomfort, backache, instability of biorhythm, cancer, etc. For this reason, health of modern people has been gradually threatened.

Therefore, there is a need for methods of addressing the harm caused by the emission of blue light from a display.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus that adjusts blue light harmful to a human body, and a control method thereof.

According to an aspect of an exemplary embodiment, there is provided a display apparatus including: a display configured to display an image; an image processor configured to process the displayed image; and a controller configured to control the image processor to adjust a blue (B) value of red (R), green (G), and B values constituting the image based on at least one of information about a user and information about a viewing habit of the user.

The controller may control the image processor to reduce the B value of the R, G, and B values in real time based on at least one of the information about the user and the information about the viewing habit of the user.

The controller may control the image processor to convert the R, G, and B values into a spectral distribution and adjust a wavelength value corresponding to the B value.

The controller may control the image processor to detect a preset object of the image and adjust the B value of the R, G, and B values corresponding to the image except the detected preset object.

The information about the user may include at least one of gender information, age information, eyesight information, and life pattern information of the user.

The information about the viewing habit of the user may include at least one of a viewing time, a viewing position, and a viewing posture.

The display apparatus may further include a user interface (UI) unit. The controller may control the image processor to adjust the B value of the R, G, and B values based on time information input through the UI unit.

According to an aspect of another exemplary embodiment, there is provided a method of controlling a display apparatus. The method may include: receiving an image; adjusting a B value of R, G, and B values constituting the image based on at least one of information about a user and information about a viewing habit of the user; and displaying the image having the adjusted B value.

The B value of the R, G, and B values may be adjusted in real time to be reduced based on at least one of the information about the user and the information about the viewing habit of the user.

The R, G, and B values may be converted into a spectral distribution, and then a wavelength value of the B value may be adjusted.

A preset object of the image may be detected, and the B value of the R, G, and B values corresponding to the image except the detected preset object may be adjusted.

The information about the user may include at least one of gender information, age information, eyesight information, and life pattern information of the user.

The information about the viewing habit of the user may include at least one of a viewing time, a viewing position, and a viewing posture.

The method may further include: receiving time information; and adjusting the B value of the R, G, and B values based on the time information.

According to an aspect of another exemplary embodiment, a method of controlling a display apparatus is provided. The method includes: storing at least one of information about a user and information about a viewing habit of the user; adjusting a blue (B) value from among red (R), green (G), and B values of an image based on the at least one of the information about the user and the information about the viewing habit of the user; and displaying the image having the adjusted B value.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
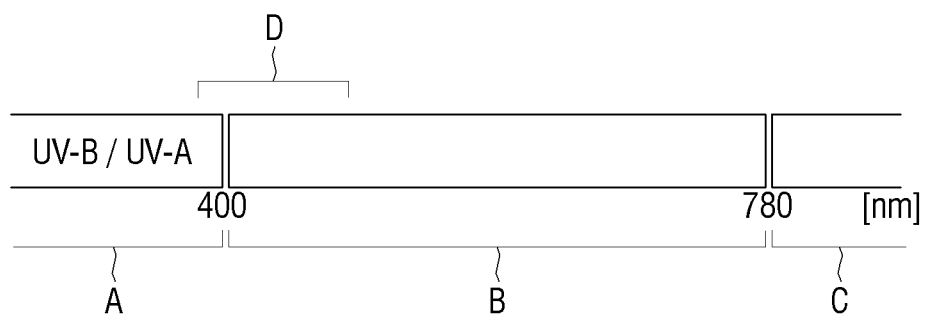
FIG. 1 is a view illustrating a wavelength of blue light.
Figure 2:
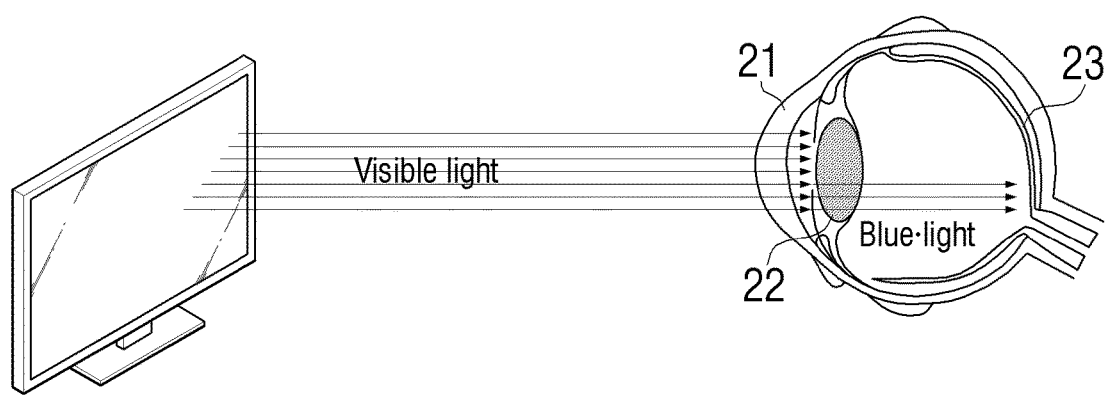
FIG. 2 is a view illustrating an effect of blue light on a retina.

Exemplary embodiments are described in greater detail with reference to the accompanying drawings.

In the following description, the same drawing reference numerals are used for the same elements even in different drawings. The matters described in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 3:
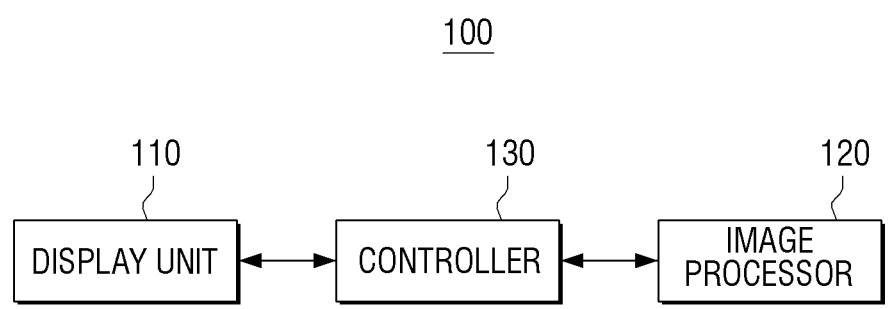
FIG. 3 is a block diagram illustrating a structure of a display apparatus according to an exemplary embodiment.

FIG. 3 is a block diagram illustrating a structure of a display apparatus 100 according to an exemplary embodiment.

Referring to FIG. 3, the display apparatus 100 includes a controller 130, an image processor 120, and a display unit 110.

Hereinafter, the display apparatus 100 will be described as being implemented as a TV that processes a broadcasting image based on a broadcasting signal, broadcasting information, and broadcasting data received from a transmitter of a broadcasting station. However, the present general inventive concept is not limited thereto and may be applied to various types of monitors, smartphones, portable multimedia players (PMPs), notebook computers, electronic dictionaries, etc. that process images, besides the TV.

The display unit 110 displays an image. In detail, the display unit 110 may display an image that is processed through the image processor 120 under control of the controller 130. The display unit 110 may be implemented as a liquid crystal display (LCD) panel, an organic light-emitting diode (OLED), or the like but is not limited thereto. The display unit 110 may also include a driving circuit that may be implemented as an amorphous silicon (a-Si) thin film transistor (TFT), a low temperature polysilicon (LTPS) TFT, an organic TFT (OTFT) or the like, a backlight unit, etc.

The image processor 120 performs various types of preset image processing on an image signal that is received. For example, the image processor 120 performs signal processing, such as demultiplexing, deinterleaving, decoding, etc., on the image signal included in the received broadcasting signal to generate an image frame. The image processor 120 may also perform various types of image processing, such as decoding, scaling, noise filtering, frame rate conversion, a resolution conversion, etc., video data included in the generated image frame. According to this method, the image processor 120 outputs the image signal, on which processes as described above are performed, to the display unit 110.

The controller 130 performs control operations on various types of elements of the display apparatus 100. In particular, the controller 130 may perform various types of control operations to correspond to performances and signals of image processing performed by the image processor 120, signals, information, transmission and reception operations of data, a user input, etc. processed by the image processor 120 to control an overall operation of the display apparatus 100.

In detail, the controller 130 analyzes information about a user and information about a viewing habit of the user. The controller 130 may control the image processor 120 to adjust a B value of red (R), green (G), and blue (B) values constituting the image, based on at least one of the information about the user and the information about the viewing habit of the user. For example, the B value may be adjusted and the R and B values may remain unadjusted. Here, the B value may refer to a pixel value or a pixel level of a B pixel included in a unit pixel. Also, the display apparatus 100 may further include a storage unit that stores the information about the user and the information about the viewing habit of the user. The storage unit will be described later with reference to FIG. 4, and a detailed operation of the controller 130 will now be described.

The controller 130 may control to calculate a distance between the user and the display unit 110, i.e., a viewing distance, in order to adjust the B value. In detail, if the viewing distance is short, the controller 130 may control to increase a decrement in the B value of the image. If the viewing distance is long, the controller 130 may control to decrease the decrement in the B value. In this case, a reference viewing distance may be preset and then stored in the storage unit, and the controller 130 may compare a current viewing distance with the stored reference viewing distance to control the decrement in the B value The controller 130 may control to calculate a viewing time of the user in order to adjust the B value. In detail, the controller 130 may measure the viewing time of the user and compare the measured viewing time with a preset viewing time. Therefore, if the measured viewing time exceeds the preset viewing time, the controller 130 may control to increase the decrement of the B value. In this case, the preset viewing time may be pre-stored in the storage unit, and the display apparatus 100 may further include a timer (not shown) that counts a current viewing time.

The controller 130 may control to adjust the B value of the image based on an age of the user. In detail, if the user is under age or in old age, the controller 130 may control to increase the decrement in the B value of the image. If the user is of a younger generation, the controller 130 may control to decrease the decrement in the B value. In this case, information about the age of the user may be pre-stored in the storage unit.

The controller 130 may control to adjust the B value of the image based on a life pattern of the user. For example, the life pattern of the user may refer to various types of information such as a bedtime, a waking up time, etc., and the controller 130 may analyze activities of mind and body based on information of the life pattern of the user. Therefore, the controller 130 may control to decrease the decrement in the B value at a time of a day when mind and body are activated and increase the decrement in the B value at a time of the day when mind and body are inactivated.

The controller 130 may detect a preset object of a displayed image. In particular, the controller 130 may control to adjust a B value of another area except the preset object. In detail, the controller 130 may control to decrease only the B value of the other area except the object, without decreasing a B value of the preset object.

As described above, the display apparatus 100 according to the present exemplary embodiment may efficiently adjust a B value according to various conditions.

Figure 4:
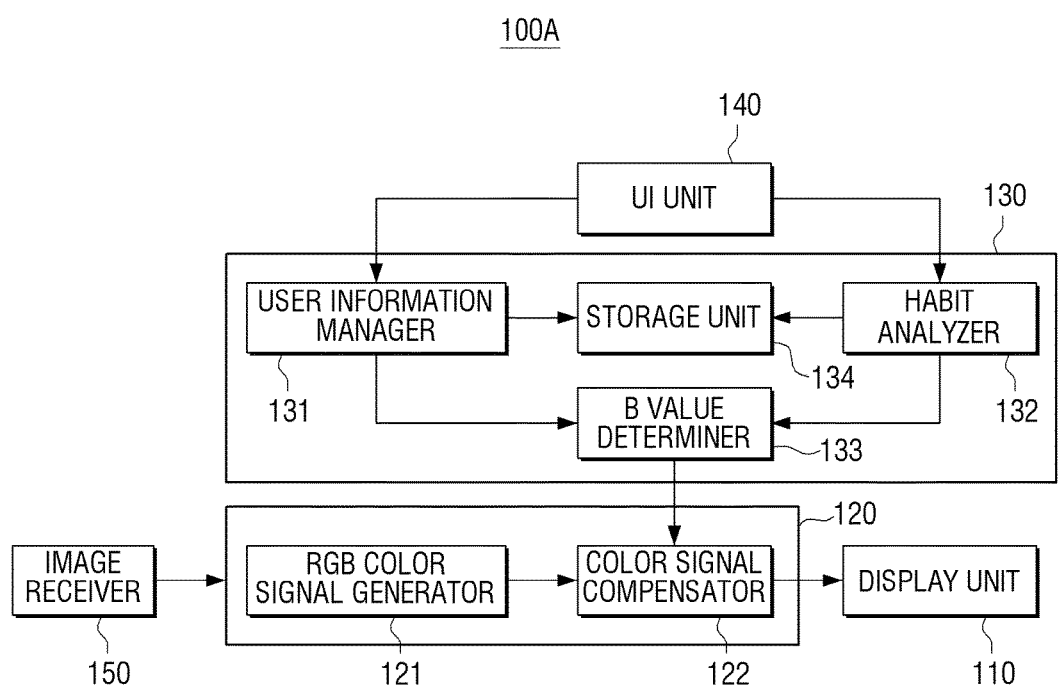
FIG. 4 is a block diagram illustrating a structure of a display apparatus according to another exemplary embodiment.

FIG. 4 is a block diagram illustrating a structure of a display apparatus 100A, according to another exemplary embodiment. Referring to FIG. 4, the display apparatus 100A may further include an image receiver 150 and a user interface (UI) unit 140. The image processor 120 includes an RGB color signal generator 121 and a color signal compensator 122, and the controller 130 includes a user information manager 131, a habit analyzer 132, a B value determiner 133, and a storage unit 134. Descriptions of elements of the display apparatus 100A of FIG. 4 which are the same as those elements of the display apparatus 100 of FIG. 3 are omitted herein.

The image receiver 150 is an element that receives an image signal and transmits the image signal to the image processor 120. The image receiver 150 may be variously implemented according to a standard and a source of the received image signal.

The image signal received by the image receiver 150 is transmitted to the image processor 120. The RGB color signal generator 121 of the image processor 120 may convert the image signal received from the image receiver 150 into an RGB color signal that may be displayed on the display unit 110 and generate R, G, and B color signals by using the received image signal. The generated R, G, and B color signals are transmitted to the color signal compensator 122.

The color signal compensator 122 may adjust a pixel value corresponding to the B color signal of the R, G, and B color signals, i.e., a B value. Here, the color signal compensator 122 may adjust an image according to a B value determined by the B value determiner 133. An image, a B value of which is adjusted by the color signal compensator 122, undergoes various types of image processing and then is transmitted to the display unit 110 to be displayed on the display unit 110.

The UI unit 140 is an element that receives an input of a user. For example, the UI unit 140 may be implemented as a touch screen. In this case, the input of the user may be input through a touch screen panel. The UI unit 140 may also be implemented as a keyboard, a mouse, or the like to receive the input of the user according to respective realization types. However, the UI unit 140 is not limited thereto and may be implemented as a device, such as a camera, a sensor, or the like, that receives information about the user and information about a viewing habit of the user.

The user information manager 131 may manage the information about the user that is input through the UI unit 140. Here, the information about the user may include various types of personal information, life patterns, or the like of the user, such as a gender of the user, an age of the user, color sense abnormality information of the user such as an eyesight, color blindness, color weakness, or the like, etc.

The viewing habit analyzer 132 may analyze a viewing habit of the user that is input through the UI unit 140. Here, the viewing habit of the user may include various types of viewing habits of the user such as various viewing methods, viewing patterns, etc. such as a viewing time, a viewing position, and a viewing posture of the user The B value determiner 133 is an element that determines a B value of a received image based on the information about the user and the information about the viewing habit of the user. In detail, the B value determiner 133 receives each of the information about the user and the information about the viewing habit of the user from the user information manager 131 and the viewing habit analyzer 132. Therefore, the B value determiner 133 may determine a pixel value, i.e., a B value, based on the information about the user and the information about the viewing habit of the user. A detailed method of determining a B value will be described in detail later with reference to FIGS. 5 through 9.

A decrement in the B value of the received image may be determined according to the B value determined by the B value determiner 133. Therefore, the B value determiner 133 may transmit information about the decrement in the determined B value to the color signal compensator 122.

The storage unit 134 stores the information about the user and the information about the viewing habit of the user. Therefore, the information about the viewing habit of the user stored in the storage unit 134 may be used for current viewing of the user, and the display apparatus 100 may learn the viewing habit of the user according to this method. Here, the learning of the viewing habit of the user may refer to be used to store viewing information acquired by repeating viewing of the user in various environments and analyze a current viewing habit.

A method of adjusting a B value according to various viewing conditions will now be described in detail. However, the present general inventive concept is not limited to the method that will be described below, and the B value may be adjusted by using various methods.

Figure 5A:
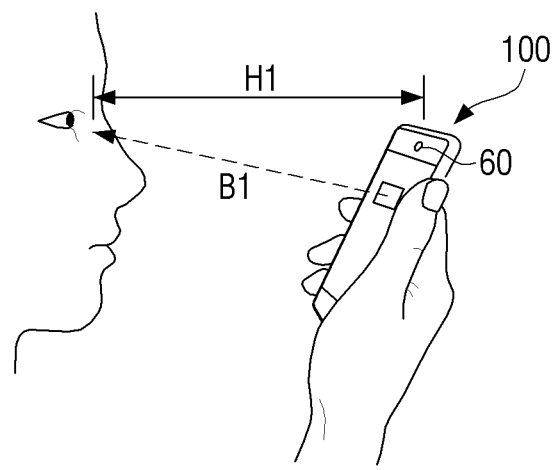
FIGS. 5A and 5B are views illustrating a relation between a viewing distance and emitted blue light, according to an exemplary embodiment.
Figure 5B:
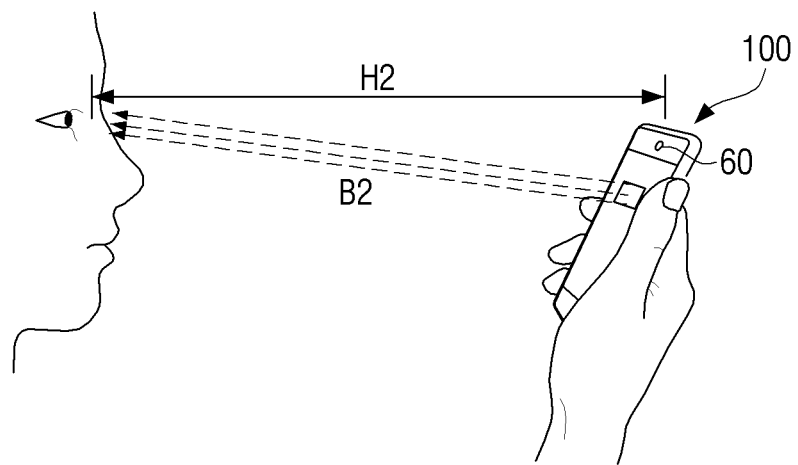

A method of adjusting a B value according to a viewing distance, i.e., a distance between the display apparatus 100 and eyes of the user, will now be described with reference to FIGS. 5A and 5B. FIGS. 5A and 5B are views illustrating a relation between a viewing distance and emitted blue light in the display apparatus 100, according to an exemplary embodiment of the present general inventive concept. In particular, FIG. 5A illustrates an amount B1 of blue light output in a particular area of the display unit 110 when a viewing distance is H1. FIG. 5B illustrates an amount B2 of blue light output in a particular area of the display unit 110 when a viewing distance is H2.

Referring to FIGS. 5A and 5B, the viewing distance shown in FIG. 5B is longer than the viewing distance shown in FIG. 5A. In this case, the controller 130 may control to adjust an output B value according to a viewing distance. In other words, if a current viewing distance is longer than or equal to a preset viewing distance, the controller 130 may decrease a decrement in a B value. If the current viewing distance is shorter than the preset viewing distance, the controller 130 may increase the decrement in the B value. Therefore, an amount of blue light output in a particular area of the display unit 110 shown in FIG. 5B is much more than an amount of blue light output in a particular area of the display unit 110 shown in FIG. 5A.

If a viewing distance is relatively long, although an amount of blue light output from the display unit 110 is increased as described above, an effect of blue light on eyes of the user may be reduced.

A viewing distance may be preset and stored by the user, and this is as described with reference to FIG. 3.

Also, a tracking image processing technology using a sensor 60 that tracks a head or eyes of the user to calculate a viewing distance may be applied. In this case, the sensor may be an infrared sensor that senses a distance between the eyes of the user, positions of the eyes of the user, etc. and may be disposed at various places such as a front surface, a side, etc. of the display apparatus 100 or 100A.

Figure 6:
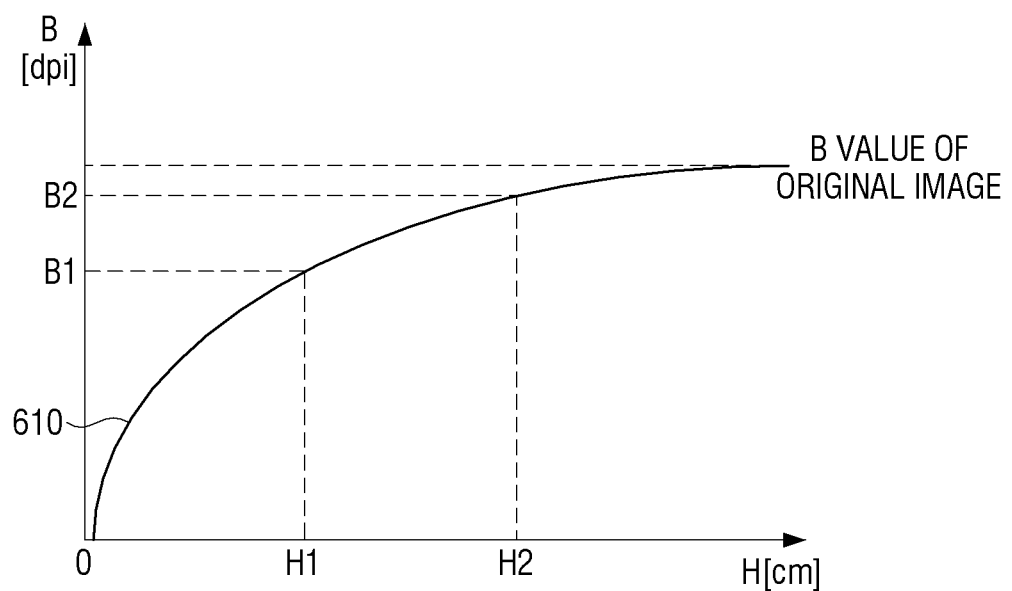
FIG. 6 is a graph illustrating a relation between a blue value and a distance, according to an exemplary embodiment.

FIG. 6 is a graph illustrating a relation between a B value and a viewing distance, according to an exemplary embodiment.

Referring to FIG. 6, a B value 610 increases with an increase in a viewing distance.

In detail, as the viewing distance becomes shorter, an effect of blue light on eyes increases, and thus the controller 130 increases a decrement in the B value. If the viewing distance becomes longer, the effect of the blue light on the eyes decreases, and thus the controller 130 decreases the decrement in the B value.

Here, a size of the decrement in the B value according to the viewing distance, i.e., a decrement slope, may be differently set. In detail, as the viewing distance is short, the effect of the blue light on the eyes of the user is great. In this case, the controller 130 may increase the decrement slope of the B value.

The B value that is adjusted according to the viewing distance has been described with reference to FIG. 6 but may be adjusted according to a viewing position, a viewing posture, etc. of the user.

Figure 7:
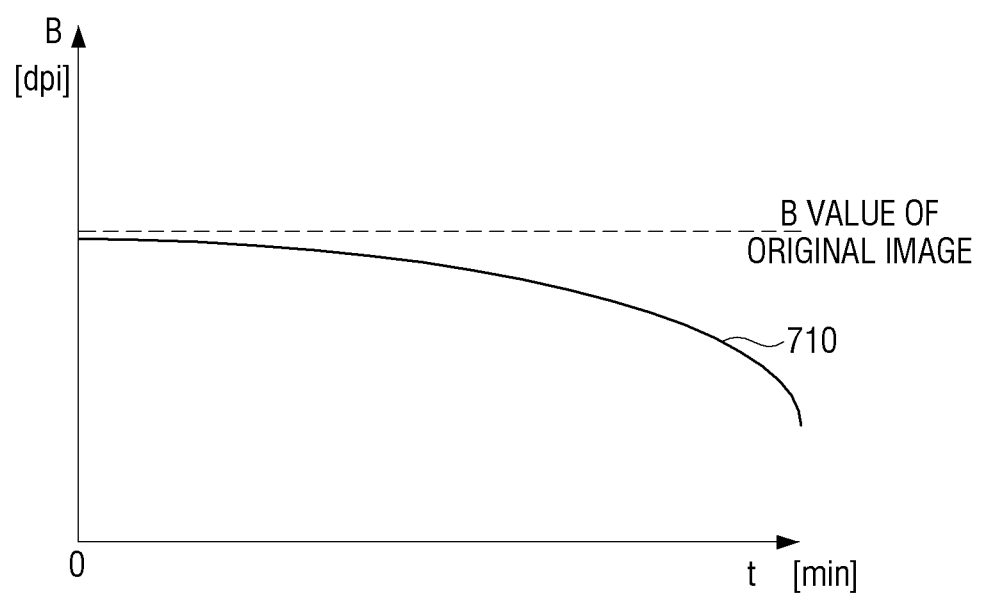
FIG. 7 is a graph illustrating a relation between a blue value and a time, according to an exemplary embodiment.

FIG. 7 is a graph illustrating a relation between a B value and a viewing time, according to an exemplary embodiment.

Referring to FIG. 7, the controller 130 may control to gently decrease a B value 710 as a viewing time elapses.

The viewing time may be directly input from a user and may be counted by a timer (not shown). The viewing time may also be acquired by a tracking image processing technology.

Figure 8:
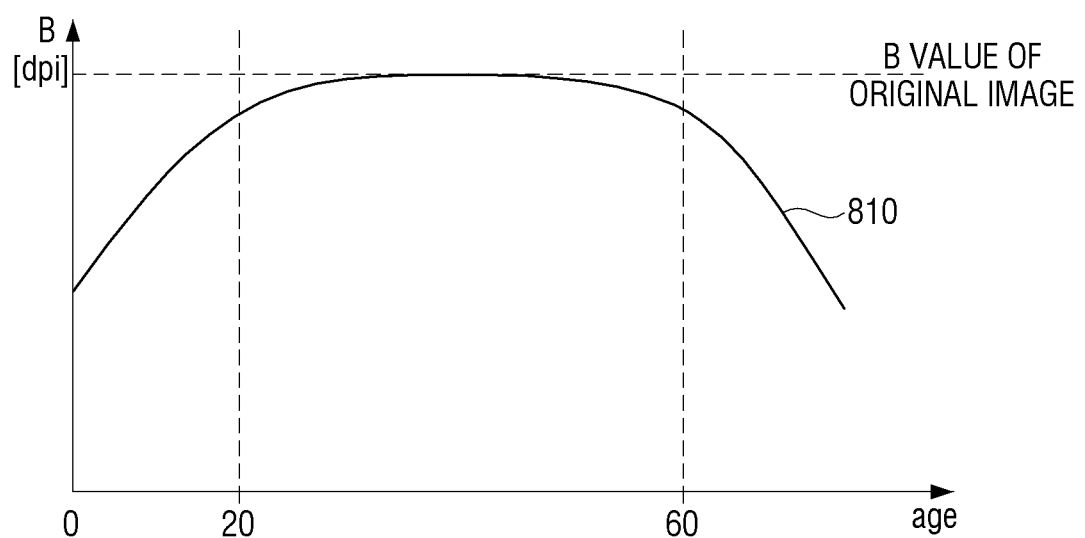
FIG. 8 is a graph illustrating a relation between a blue value and an age, according to an exemplary embodiment.

FIG. 8 is a graph illustrating a relation between a B value and a user's age, according to an exemplary embodiment.

Referring to FIG. 8, the controller 130 may adjust a decrement of a B value 810 according to an age of a user. In detail, infants, teenagers (in general, under 20 years old), and old generation (in general, 60 years old and over) may have higher retinal damages caused by blue light than younger generation (in general, 20 years old and over and under 60 years old). Therefore, the controller 130 may adjust the decrement in the B value according to the age of the user.

In this case, the age of the user may be directly input by the user or birth information may be received from a server (not shown) through a network to input the age of the user. Also, a method of recognizing a user face that is acquired through a camera (not shown) capturing the user face to estimate the age of the user may be used. Also, the controller 130 may adjust the B value based on gender or eyesight information of the user. For example, if an eyesight level of the user is lower than a preset eyesight level, the controller 130 may increase the decrement in the B value.

Figure 9:
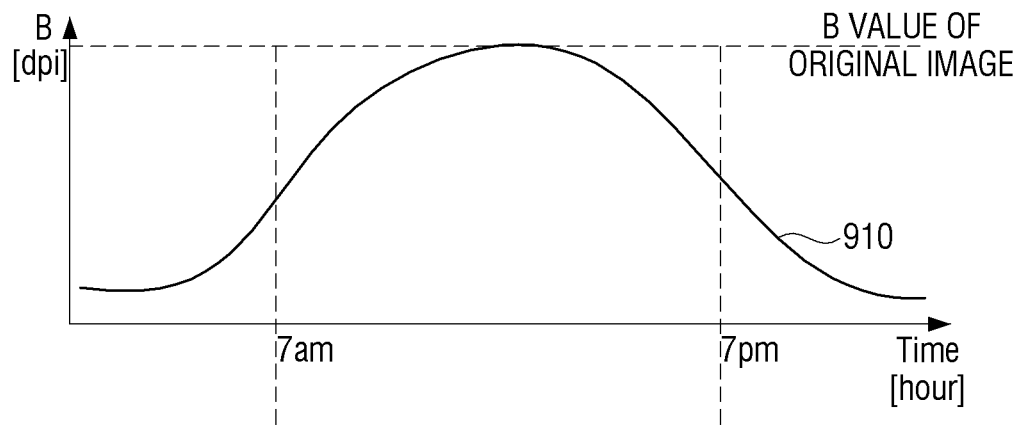
FIG. 9 is a graph illustrating a relation between a blue value and a circadian rhythm, according to an exemplary embodiment.

FIG. 9 is a graph illustrating a relation between a B value 910 and a circadian rhythm, according to an exemplary embodiment.

Referring to FIG. 9, a biological clock may be analyzed to acquire the circadian rhythm that occurs regularly at about 24-hour intervals. Here, the circadian rhythm may refer to a biological rhythm that occurs regularly at about 24-hour intervals. Also, the biological clock may be estimated by integrating and analyzing an internal clock that is acquired by measuring an external clock, a core temperature, etc. Here, the external clock may be stored in the storage unit 134 or may be generated by analyzing log information about a bedtime of the user, log information about a rising hour of the user, log information about a daily life of the user, etc. A method of estimating a biological clock by using an external clock and an internal clock is a well-known technology, and thus a detailed description thereof is omitted.

If the circadian rhythm is required to be changed due to a business trip, a shiftwork, or the like of the user, the user may directly adjust the B value.

Therefore, the display apparatus 100 may adjust an amount of blue light according to the circadian rhythm of the user to make the amount of the blue light appropriate for activities of mind and body of the user.

Figure 10:
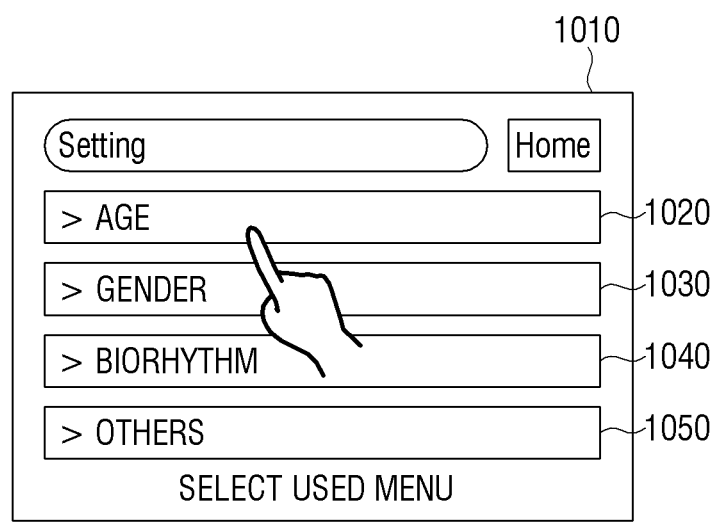
FIG. 10 is a view illustrating a screen that displays a menu setting a blue value, according to an exemplary embodiment.

FIG. 10 is a view illustrating a UI screen according to an exemplary embodiment.

In detail, FIG. 10 illustrates a method of directly inputting user information and viewing habit information of a user by the user as an example of a screen that displays a menu setting a B value.

Referring to FIG. 10, a setting area 1010 may be formed in an area of the display unit 110. At least one menu may be displayed in the setting area 1010 to enable the user to directly input information about an age 1020, a gender 1030, a biorhythm 1040, and or other settings 1050, etc. Also, menus of the screen may be variously constituted differently from shown in FIG. 10.

Figure 11:
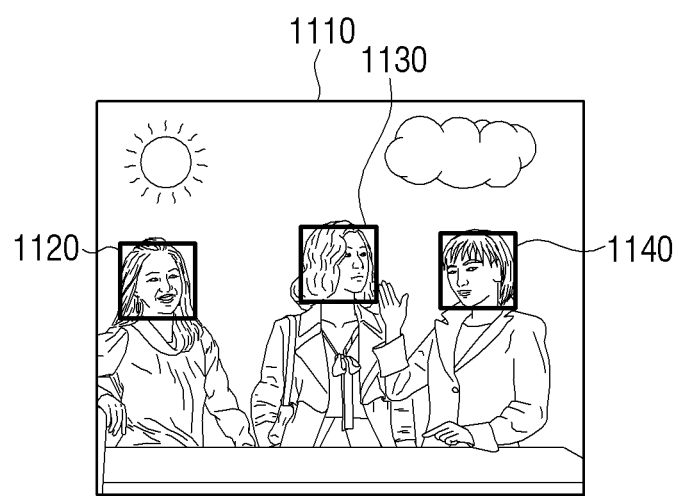
FIG. 11 is a view illustrating areas of a whole screen in which blue values are set, according to an exemplary embodiment.

FIG. 11 is a view illustrating areas in which B values are set, according to an exemplary embodiment.

Referring to FIG. 11, the display unit 110 displays content 1110. In this case, the controller 130 may detect preset objects of the display content. In other words, the controller 130 may detect particular objects of various objects of the displayed content as target objects 1120, 1130, and 1140 that are used to control B values. Among various types of objects such as faces, hands, sun, cloud, etc. included in a screen displaying the content, objects corresponding to faces of persons are set to the target objects 1120, 1130, and 1140 in FIG. 11 but are not limited thereto. A method of simply recognizing a skin tone of a person or extracting a face area by using an edge or a geometric configuration relation of face components (e.g., eyes, nose, mouth, etc.) or the like may be applied to recognize a face of the person.

The controller 130 that detects the target objects 1120, 1130, and 1140 may maintain B values of areas corresponding to the target object 1120, 1130, and 1140 and decrease B values of the other areas except the target objects 1120, 1130, and 1140.

Therefore, an amount of blue light output on a whole screen may be reduced, but a sensory image quality may be maintained.

Figure 12:
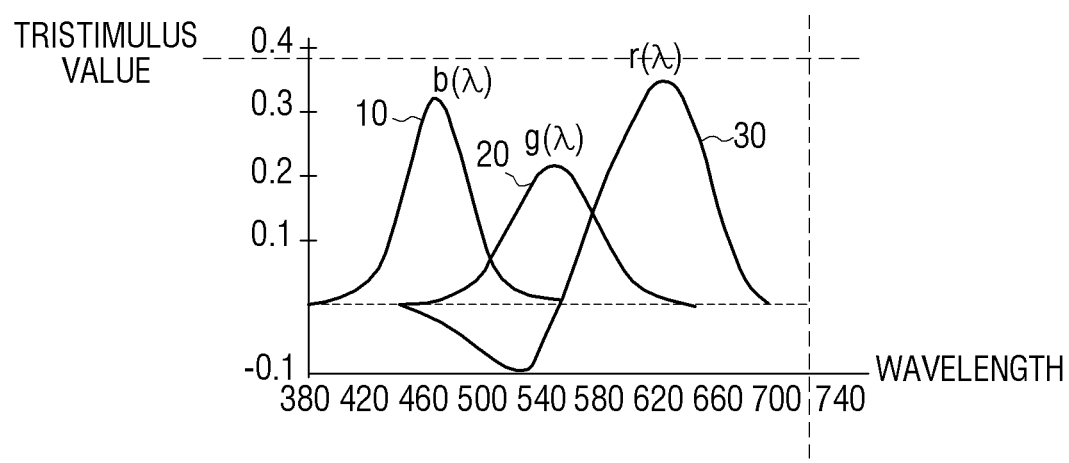
FIG. 12 is graphs illustrating a blue value that is adjusted based on a spectral distribution, according to an exemplary embodiment
Figure 12:
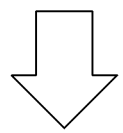
Figure 12:
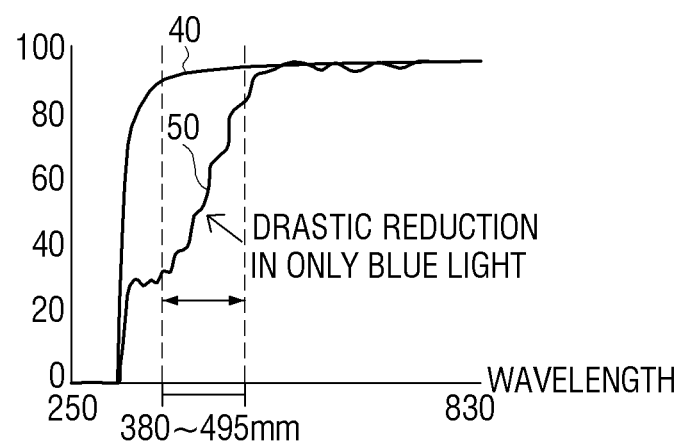

FIG. 12 is a view illustrating a B value that is adjusted based on a spectral distribution, according to an exemplary embodiment.

The color signal compensator 120 may convert R, G, and B curves 10, 20, 30 as shown on an upper end of FIG. 12 into a whole spectral distribution 40 as shown in a lower end of FIG. 12. The controller 130 may reduce only a tristimulus value 50 of a wavelength corresponding to a B value of the whole spectral distribution 40 to reduce an amount of blue light.

Figure 13:
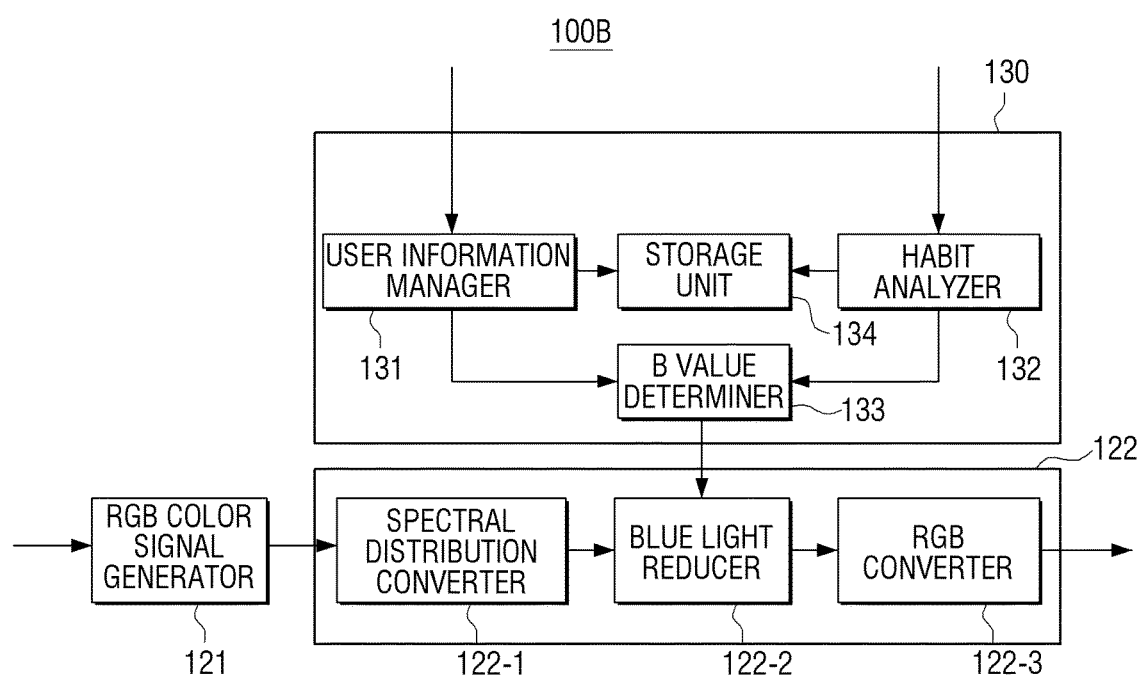
FIG. 13 is a block diagram of a display apparatus according to another exemplary embodiment.

FIG. 13 is a block diagram illustrating a structure of a display apparatus 100B, according to an exemplary embodiment.

Referring to FIG. 13, a color signal compensator 122 of the display apparatus 100B includes a spectral distribution converter 122-1, a blue light reducer 122-2, and an RGB converter 122-3. Descriptions of the same elements as those of the elements described with reference to FIGS. 3 and 4 are omitted herein.

An image received by the image receiver 150 is transmitted to the RGB color signal generator 121 to be generated as an RGB signal, and then the RGB signal is transmitted to the color signal compensator 122. In this case, the spectral distribution converter 122-1 converts the RGB signal received from the RGB color signal generator 121 into a spectral distribution. Here, the spectral distribution may refer to a distribution of spectral energy that is expressed with a function of a wavelength.

The blue light reducer 122-2 reduces a blue wavelength in a spectral distribution area based on a B value determined by the B value determiner 133. The RGB converter 122-3 converts the spectral distribution having the adjusted B value into an RGB signal and transmits the RGB signal to the image processor 120.

Figure 14:
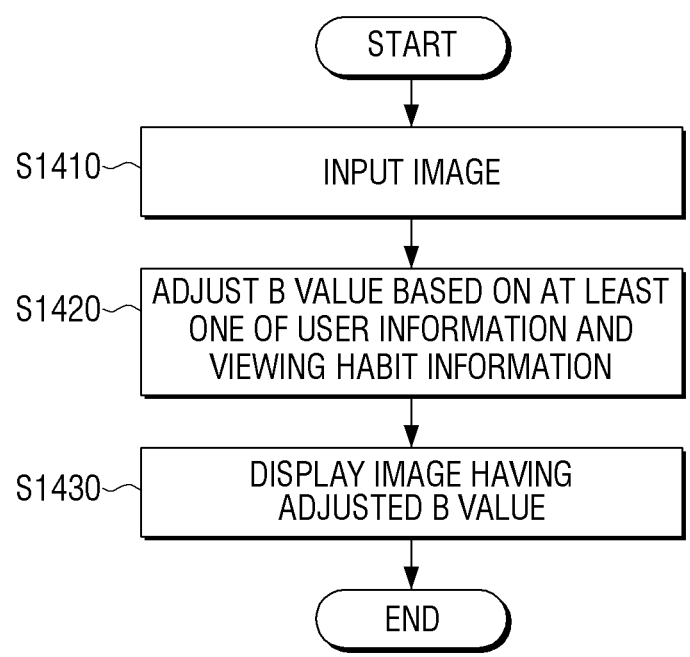
FIG. 14 is a flowchart of a method of controlling a display apparatus, according to an exemplary embodiment.

FIG. 14 is a flowchart of a method of controlling a display apparatus, according to an exemplary embodiment.

Referring to FIG. 14, in operation 51410, an image is input. In operation S1420, a B value of R, G, and B values is adjusted based on at least one of information about a user and information about a viewing habit of the user.

In operation S1430, the image having the adjusted B value is displayed.

Here, in operation S1420, the B value of the R, G, and B values may be adjusted in real time to be reduced based on at least one of the information about the user and the information about the viewing habit of the user. Operation S1420 may be repeated in at least every one frame of the image.

Also, in operation S1420, the R, G, and B values may be converted into a spectral distribution, and then a wavelength value corresponding to the B value may be adjusted.

In addition, in operation S1420, a preset object may be detected from the image, and a B value of R, G, and B values corresponding to the image except the detected object may be adjusted.

Here, the information about the user may include at least one of gender information, age information, eyesight information, and life pattern information of the user.

Also, the information about the viewing habit of the user may include at least one of a viewing time, a viewing position, and a viewing posture.

The method may further include: receiving time information; and adjusting a B value of R, G, and B values based on the received time information.

Figure 15:
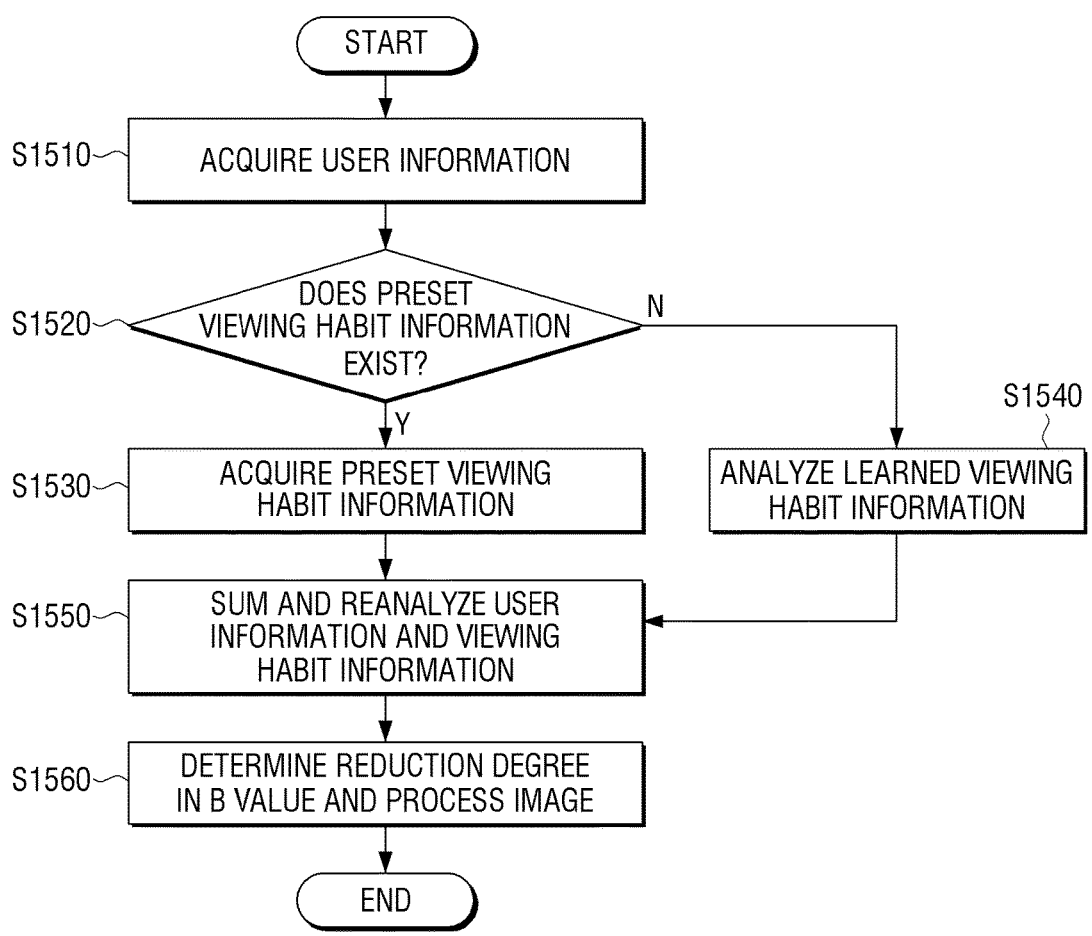
FIG. 15 is a flowchart of a method of controlling a display apparatus, according to another exemplary embodiment.

FIG. 15 is a flowchart of a method of controlling a display apparatus, according to another exemplary embodiment.

Referring to FIG. 15, if a preset event occurs, user information is acquired in operation S1510. For example, the user information may be acquired if the display apparatus is turned on, or a blue light adjusting mode is set, etc.

In operation S1520, whether preset viewing habit information exists is determined If it is determined in operation S1520 that the preset viewing habit information exists, the preset viewing habit information is acquired in operation S1530.

If it is determined in operation S1520 that the preset viewing habit information does not exist, learned viewing habit information is analyzed in operation S1540.

In operation S1550, the user information and the viewing habit information are summed to be reanalyzed. Here, the viewing habit information may be at least one of the preset viewing habit information and the learned viewing habit information.

In operation S1560, a reduction degree of a B value of R, G, and B values is determined based on the reanalyzed information, and an image is processed based on the determined reduction degree.

According to various exemplary embodiments as described above, harmfulness of blue light may be reduced, and thus health of a user may be protected.

A method of controlling a display apparatus according to various exemplary embodiments as described above may be embodied as a program and then provided to the display apparatus.

For example, the display apparatus may be provided with a non-transitory computer-readable medium that stores a program executing a configuration adjusting a B value of R, G, and B values constituting an image based on at least one of information about a user and information about a viewing habit of the user if the image is input.

The non-transitory computer-readable medium refers to a medium which does not store data for a short time such as a register, a cache memory, a memory, or the like but semi-permanently stores data and is readable by a device. In detail, the above-described various applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
  a display configured to display an image;
  a controller which adjusts a blue (B) value of red (R), green (G), and B values constituting the image according to a current elapsed viewing time of a user,
  wherein the controller measures the current elapsed viewing time counted by a timer and controls to decrease the blue value as the current elapsed viewing time increases, and wherein the controller compares the measured current elapsed viewing time with a preset viewing time, and if the measured current elapsed viewing time exceeds the preset viewing time, controls to increase a decrement of the blue value.

2. The display apparatus of claim 1, wherein the controller reduces the B value of the R, G, and B values in real time based on the current elapsed viewing time.

3. The display apparatus of claim 1, wherein the controller reduces the R, G, and B values into a spectral distribution and adjusts a wavelength value corresponding to the B value.

4. The display apparatus of claim 1, wherein the controller detects a preset object of the image and adjusts the B value of the R, G, and B values corresponding to the image except the detected preset object.

5. The display apparatus of claim 1, wherein the controller further adjusts the B value based on at least one of a viewing position of the user, and a viewing posture of the user.

6. The display apparatus of claim 1, further comprising:
a user interface (UI),
wherein the controller adjusts the B value of the R, G, and B values based on time information input through the UI.

7. A method of controlling a display apparatus, the method comprising:
adjusting, by a controller, a blue (B) value of red (R), green (G), and B values constituting an image according to a current elapsed viewing time of a user; and
displaying, by a display, the image having the adjusted B value,
wherein the adjusting further comprises measuring the current elapsed viewing time counted by a timer and controlling to decrease the blue value as the current elapsed viewing time increases,
wherein the controlling comprises comparing the measured current elapsed viewing time with a preset viewing time and if the measured current elapsed viewing time exceeds the preset viewing time, controlling to increase a decrement of the blue value.

8. The method of claim 7, wherein the B value of the R, G, and B values is adjusted in real time to be reduced based on the current elapsed viewing time.

9. The method of claim 7, wherein the R, G, and B values are converted into a spectral distribution, and then a wavelength value of the B value is adjusted.

10. The method of claim 7, wherein a preset object of the image is detected, and the B value of the R, G, and B values corresponding to the image except the detected preset object is adjusted.

11. The method of claim 7, wherein the adjusting further comprises adjusting the B value based on at least one of a viewing position of the user, and a viewing posture of the user.

12. The method of claim 7, further comprising:
receiving time information on a user interface (UI); and
adjusting, by a controller, the B value of the R, G, and B values based on the time information.

13. A method of controlling a display apparatus, the method comprising:
adjusting, by a controller, a blue (B) value from among red (R), green (G), and B values of an image according to a current elapsed viewing time of a user; and
displaying, by a display, the image having the adjusted B value,
wherein the adjusting further comprises measuring the current elapsed viewing time counted by a timer and controlling to decrease the blue value as the current elapsed viewing time increases, and
wherein the controlling comprises comparing the measured current elapsed viewing time with a preset viewing time and, if the measured current elapsed viewing time exceeds the preset viewing time, controlling to increase a decrement of the blue value.

14. The method of claim 13, wherein the R, G, and B values are converted into a spectral distribution, and then a wavelength value of the B value is adjusted.

15. The method of claim 13, wherein a preset object of the image is detected, and the B value of the R, G, and B values corresponding to the image except the detected preset object is adjusted.

16. The method of claim 13, wherein the adjusting further comprises adjusting the B value based on at least one of a viewing position of the user, and a viewing posture of the user.

17. A non-transitory computer readable medium comprising instructions executable by a computer to perform the method of claim 13.

* * * * *